(12) United States Patent
Parham et al.

(10) Patent No.: US 6,839,342 B1
(45) Date of Patent: Jan. 4, 2005

(54) SYSTEM AND METHOD FOR INTERFACING SIGNALING INFORMATION AND VOICE TRAFFIC

(75) Inventors: Eric Sean Parham, Austin, TX (US); Brian E. Williams, Plano, TX (US); Anthony John Paul Carew, Austin, TX (US); Robert Whitcher, Austin, TX (US)

(73) Assignee: General Bandwidth Inc., Austin, TX (US)

(*) Notice: Subject to any disclaimer, the term of this patent is extended or adjusted under 35 U.S.C. 154(b) by 265 days.

(21) Appl. No.: 09/685,762

(22) Filed: Oct. 9, 2000

(51) Int. Cl.[7] .................................................. H04L 12/66

(52) U.S. Cl. ..................................... 370/352; 370/384

(58) Field of Search .............................. 370/352, 360, 370/384, 385, 465, 467, 400, 401, 410

(56) References Cited

U.S. PATENT DOCUMENTS

| | | | |
|---|---|---|---|
| 4,381,427 A | 4/1983 | Cheal et al. ............... 179/2 DP |
| 4,493,092 A | 1/1985 | Adams ........................ 375/36 |
| 4,504,942 A | 3/1985 | Aro et al. ..................... 370/58 |
| 4,507,793 A | 3/1985 | Adams ........................ 375/36 |
| 4,512,025 A | 4/1985 | Frankel et al. ............... 375/36 |
| 4,578,537 A | 3/1986 | Faggin et al. ............. 179/2 DP |
| 4,608,686 A | 8/1986 | Barsellotti ................ 370/69.1 |
| 4,627,046 A | 12/1986 | Bellamy ...................... 370/58 |
| 4,740,963 A | 4/1988 | Eckley ..................... 370/110.1 |
| 4,748,656 A | 5/1988 | Gibbs et al. .................. 379/93 |
| 4,757,497 A | 7/1988 | Bierele et al. ............... 370/89 |
| 4,843,606 A | 6/1989 | Bux et al. ..................... 370/89 |
| 4,853,949 A | 8/1989 | Schorr et al. .................. 379/2 |
| 4,881,226 A | 11/1989 | Lechner et al. .......... 370/110.1 |
| 4,903,292 A | 2/1990 | Dillon .......................... 379/93 |
| 5,033,062 A | 7/1991 | Morrow et al. ................ 375/7 |
| 5,034,948 A | 7/1991 | Mizutani et al. .............. 370/79 |
| 5,127,003 A | 6/1992 | Doll, Jr. et al. .......... 370/110.1 |
| 5,134,611 A | 7/1992 | Steinka et al. ................ 370/79 |
| 5,142,350 A | 8/1992 | Ogata et al. ............. 370/110.1 |
| 5,142,571 A | 8/1992 | Suzuki et al. .................. 370/79 |
| 5,151,923 A | 9/1992 | Fujuwara ....................... 375/5 |
| 5,216,704 A | 6/1993 | Williams et al. ............... 379/93 |
| 5,220,560 A | 6/1993 | Ogasawara .................. 370/79 |
| 5,247,347 A | 9/1993 | Litteral et al. ................ 358/85 |
| 5,267,300 A | 11/1993 | Kao et al. ...................... 379/93 |
| 5,305,312 A | 4/1994 | Fornek et al. ................. 370/62 |
| 5,317,627 A | 5/1994 | Richardson, Jr. et al. ..... 379/88 |

(List continued on next page.)

FOREIGN PATENT DOCUMENTS

| | | | |
|---|---|---|---|
| EP | 0 841 831 A2 | 5/1998 | .......... H04Q/11/04 |
| GB | 2313979 A | 10/1997 | .......... H04M/11/06 |
| WO | WO 97/23078 | 6/1997 | .......... H04L/12/56 |

(List continued on next page.)

OTHER PUBLICATIONS

Press Release, "Telcordia Call Agent Installed & Running At 11 CTC Communications Office," Aug. 14, 2000, Morristown, New Jersey, pp. 1 and 2.*

Bonee, P., "The Rise Of The Applications–Enabled Softswitch," Aug. 2000, Internet Telephony, pp. 1–4.*

(List continued on next page.)

*Primary Examiner*—Ajit Patel
*Assistant Examiner*—Chirag Shah
(74) *Attorney, Agent, or Firm*—Baker Botts L.L.P.

(57) ABSTRACT

A telecommunications network (10) includes a gateway (18) that receives signaling information in a message based signaling format from a Class 5 softswitch (26). The gateway (18) also receives voice traffic over an inter-machine trunk from a public switched telephone network (12). The gateway (18) places the voice traffic into data packets. The gateway (18) transfers the data packets and the signaling information to an Internet Protocol network (30). The data packets and the signaling information may be transferred over a common physical link and over separate logical links.

20 Claims, 3 Drawing Sheets

U.S. PATENT DOCUMENTS

| | | | |
|---|---|---|---|
| 5,341,374 A | 8/1994 | Lewen et al. | 370/85.4 |
| 5,349,640 A | 9/1994 | Dunn et al. | 379/387 |
| 5,367,522 A | 11/1994 | Otani | 370/84 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,473,675 A | 12/1995 | Chapman et al. | 379/93 |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,604,737 A | 2/1997 | Iwami | 370/352 |
| 5,606,553 A | 2/1997 | Christie et al. | 370/394 |
| 5,610,910 A | 3/1997 | Focsaneanu et al. | 370/351 |
| 5,610,922 A | 3/1997 | Balatoni | 370/468 |
| 5,617,423 A | 4/1997 | Li et al. | 370/426 |
| 5,625,404 A | 4/1997 | Grady et al. | 348/7 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,692,035 A | 11/1997 | O'Mahony et al. | 379/93 |
| 5,719,870 A | 2/1998 | Baker et al. | 370/463 |
| 5,737,333 A | 4/1998 | Civaniar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,793,843 A | 8/1998 | Morris | 379/59 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,862,134 A | 1/1999 | Deng | 370/352 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,774 A | 3/1999 | Mirashrafi et al. | 3710/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,907,548 A | 5/1999 | Bernstein | 370/353 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,974,043 A | 10/1999 | Solomon | 370/352 |
| 5,978,390 A | 11/1999 | Balatoni | 370/540 |
| 5,982,767 A | 11/1999 | McIntosh | 370/352 |
| 5,991,292 A | 11/1999 | Focsaneanu et al. | 370/352 |
| 5,999,565 A | 12/1999 | Locklear, Jr. et al. | 375/222 |
| 5,999,598 A | 12/1999 | Henrick et al. | 379/93.07 |
| 6,075,784 A | 6/2000 | Frankel et al. | 370/356 |
| 6,075,796 A | 6/2000 | Katseff et al. | 370/466 |
| 6,078,580 A | 6/2000 | Mandalia et al. | 370/352 |
| 6,081,517 A | 6/2000 | Liu et al. | 370/352 |
| 6,101,182 A | 8/2000 | Sistanizadeh et al. | 370/352 |
| 6,112,084 A | 8/2000 | Sicher et al. | 455/426 |
| 6,118,780 A | 9/2000 | Dunn et al. | 370/355 |
| 6,125,113 A | 9/2000 | Farris et al. | 370/389 |
| 6,125,117 A | 9/2000 | Martin et al. | 370/397 |
| 6,130,879 A | 10/2000 | Liu | 370/230 |
| 6,130,883 A | 10/2000 | Spear et al. | 370/328 |
| 6,134,235 A | 10/2000 | Goldman et al. | 370/352 |
| 6,141,339 A | 10/2000 | Kaplan et al. | 370/352 |
| 6,144,667 A | 11/2000 | Doshi et al. | 370/401 |
| 6,144,670 A | 11/2000 | Sponaugle et al. | 370/401 |
| 6,154,445 A | 11/2000 | Farris et al. | 370/237 |
| 6,157,637 A | 12/2000 | Galand et al. | 370/356 |
| 6,167,042 A | 12/2000 | Garland et al. | 370/354 |
| 6,175,562 B1 | 1/2001 | Cave | 370/352 |
| 6,175,854 B1 | 1/2001 | Bretscher | 709/201 |
| 6,181,694 B1 | 1/2001 | Pickett | 370/353 |
| 6,181,715 B1 | 1/2001 | Phillips et al. | 370/493 |
| 6,201,806 B1 | 3/2001 | Moffett | 370/356 |
| 6,208,639 B1 | 3/2001 | Murai | 370/356 |
| 6,222,829 B1 | 4/2001 | Karlsson et al. | 370/329 |
| 6,229,810 B1 | 5/2001 | Gerszberg et al. | 370/401 |
| 6,236,653 B1 | 5/2001 | Dalton et al. | 370/352 |
| 6,240,084 B1 | 5/2001 | Oran et al. | 370/352 |
| 6,240,085 B1 | 5/2001 | Iwami et al. | 370/352 |
| 6,243,377 B1 | 6/2001 | Phillips et al. | 370/354 |
| 6,243,398 B1 | 6/2001 | Kahane et al. | 370/522 |
| 6,259,708 B1 | 7/2001 | Cheng et al. | 370/493 |
| 6,262,979 B1 | 7/2001 | Anderson et al. | 370/267 |
| 6,445,694 B1 * | 9/2002 | Swartz | 370/352 |
| 6,463,052 B1 * | 10/2002 | Christie | 370/352 |
| 2001/0043590 A1 * | 11/2001 | Dougall et al. | 370/352 |
| 2002/0024945 A1 * | 2/2002 | Civanlar | 370/352 |
| 2002/0101859 A1 * | 8/2002 | Maclean | 370/352 |
| 2002/0114274 A1 * | 8/2002 | Sturges et al. | 370/229 |
| 2003/0161296 A1 * | 8/2003 | Butler et al. | 370/352 |

FOREIGN PATENT DOCUMENTS

| | | | |
|---|---|---|---|
| WO | WO 97/37458 | 9/1997 | |
| WO | WO 98/42104 | 9/1998 | H04L/12/28 |
| WO | WO 99/49608 | 9/1999 | |
| WO | WO 00/35157 | 6/2000 | H04L/12/66 |
| WO | WO 00/56050 | 9/2000 | H04M/11/00 |
| WO | WO 00/69131 | 11/2000 | H04L/12/64 |
| WO | WO 01/05130 A1 | 1/2001 | H04M/3/48 |
| WO | WO 01/06720 A1 | 1/2001 | H04L/12/64 |
| WO | WO 01/13593 A1 | 2/2001 | H04L/12/64 |
| WO | WO 01/13618 A1 | 2/2001 | H04M/11/06 |

OTHER PUBLICATIONS

Kafel, A., "The Intelligent Edge: Facilitating Network Convergence," Aug. 7, 2000, Telephony, Intertec/Primedia Publication, pp. 1–4.*

Gudapati, et al., "Local Telephone Service for Cable Subscribers Using Packet Switched Access," ISS. World Telecommunications Congress, pp. 325–329, Sep. 21, 1997.

L. Van Hauwermeiren, et al., "Offering Video Services over Twisted Pair Cables to the Residential Subscriber by Means of an ATM Based ADSL Transmission System," ISS Symposium, vol. 1, 5 pages, Apr. 1995.

T.C. Kwok, "Residential Broadband Architecture Over ADSL and G. Lite (G.992.2): PPP Over ATM," XP–000830885, IEEE Communication Magazine, 6 pages, May 1999.

Notification of Transmittal of the International Search Report or the Declaration, 6 pages, May. 2, 2001.

Notification of Transmittal of the International Search Report or the Declaration, 7 pages, Jun. 29, 2001.

Notification of Transmittal of the International Search Report or the Declaration, 6 pages, Oct. 19, 2001.

Unknown, "Gateway control protocol," ITU–T Telecommunication Standardization Sector of ITU, Series H: Audiovisual and Multimedia Systems, Infrastructure of audiovisual services—Communication procedures, ITU–T Recommendation H.248, 224 pages, Jun. 2000.

Unknown, "Packet–based multimedia communications systems," ITU–T Telecommunication Standardization Sector of ITU, Series H: Audiovisual and Multimedia Systems, Infrastructure of audiovisual services—Systems and terminal equipment for audiovisual services, ITU–T Recommendation H.323, 124 pages, Feb. 1998.

Unknown, "Voice and Telephony Over ATM—ATM Trunking using AAL1 for Narrowband Services, Version 1.0," The ATM Forum Technical Committee, AF–VTOA–0089.000, 64 pages, Jul. 1997.

Unknown, "Voice and Telephony Over ATM to the Desktop Specification," The ATM Forum Technical Committee, af–vtoa–0083.000, 43 pages, May 1997.

Unknown, "Call Signaling Protocols and Media Stream Packetization for Packet Based Multimedia Communications Systems," ITU–T Telecommunication Standardization Sector of ITU, Line Transmission of Non–Telephone Signals, ITU–T Recommendation H.225.0, Version 2, 141 pages, Mar. 25, 1997.

Unknown, "Visual telephone systems and equipment for local area networks which provide a non–guaranteed quality of service," ITU–T Telecommunication Standardization Sector of ITU, Series H: Audiovisual and Multimedia services—Systems and terminal equipment for audiovisual services, ITU–T Recommendation H.323, 79 pages, Nov. 1996.

Unknown, "Adaptation of H.320 visual telephone terminals to B–ISDN environments," ITU–T Telecommunication Standardization Sector of ITU, Series H: Transmission of Non–Telephone Signals, Infrastructure of audiovisual services—Systems and terminal equipment for audiovisual services, ITU–T Recommendation H.321, 20 pages, Mar. 1996.

J.M. Fossaceca, J.D. Sandoz, and P. Winterbottom, "The PathStar™ Access Server: Facilitating Carrier–Scale Packet Telephony," Bell Labs Technical Journal, 17 pages, Oct. 12, 1998.

F. Dawson, Contributing Editor, "Packet–Based Voice, Video Becoming Real Market, New software, codecs make integration of voice over data networks more feasible and affordable," http://www.zdnet.com/intweek/print/970303/inwk0006.html, 6 pages, c 1997 Aug. 7, 2001.

Unknown, "Telogy Networks' Voice over Packet White Paper," http://www.telogy.com/our_products/golden_gateway/VOPwhite.html, 14 pages, Aug. 7, 2001.

Unknown Author, "The Role of Voice–Data Integration in Transforming your Business to e–business," IBM Networking White Papers: Voice–Data Integration in e–business, http://www.networking.ibm.com/voice/voice–data.html, 23 pages, Aug. 7, 2001.

Unknown Author, Press Release, "VOCALTEC expands telephony gateway product line with new eight–line solution for corporate intranets and internet service providers," VocalTec—The First and the Best, http://www.vocaltec.com/html/news1996/press_11_25.html, 5 pages, Aug. 7, 2001.

Unknown Author, Press Release, "VOCALTEC introduces the internet phone telephony gateway linking traditional and internet telephone networks," VocalTec—The First and the Best, http://www.vocaltec.com/html/news1996/press_03_08.html, 3 pages, Aug. 7, 2001.

Unknown Author, Press Release, "VOCALTEC's telephony gateway software captures 1996 product of the year honors from Computer Telephony magazine," VocalTec—The First and the Best, http://www.vocaltec.com/html/news1996/press_12_18.html, 3 pages, Aug. 7, 2001.

V.C. Majeti, "A Network Management Model for ADSL–based Broadband Systems," ADSL Forum Network Management Group, Brussels, Belgium, ADSL–Forum 97–112, 4 pages, Sep. 15, 1997.

V.C. Majeti, "Network Management System (NMS) Operations for ADSL–based Broadband Systems," ADSL Forum Network Management Group, Brussels, Belgium, ADSL Forum 97–113, 4 pages, Sep. 15, 1997.

Unknown Author, "Network Migration Working Text," ADSL Forum WT–013, ADSL Forum WT013, Draft D, 60 pages, Jul. 8, 1997.

Unknown Author, "Network Migration Working Text," ADSL Forum WT–013, ADSLForum WT013, Draft C, 55 pages, Apr. 18, 1997.

Unknown Author, "Network Migration Working Text," ADSL Forum WT–013, ADSLForum WT013, Draft B, 53 pages, Jan. 12, 1997.

Unknown Author, "Network Migration Working Text," ADSL Forum WT–00x, ADSLForum 96–116, 32 pages, Dec. 10, 1996.

Unknown Author, "A Discussion of Voice over Frame Delay," Voice over FR, http://www.frforum.com/4000/4017052699.html, 10 pages, Aug. 7, 2001.

M. Coronaro, B. Rossi, "Integrated Office Communication System," Office Communication System, Electrical Communication—vol. 60, No. 1, 1986.

L–P. Anquetil et al., "Media Gateway Control Protocol and Voice Over IP Gateways," XP–000830045, *Alcatel Telecommunications Review*, 2nd Quarter 1999, 7 pages.

Maher Hamdi et al., "Voice Service Interworking for PSTN and IP Networks," XP–000830888, *IEEE Communications Magazine*, May 1999, 8 pages.

International Search Report in International Application No. PCT/US 01/31644, dated Feb. 14, 2002, 7 pages.

Chou, Joey, "The migration of LES to the Next Generation Network based on H.248", ATM Forum, May 8–12, 2000, San Francisco, California; 23 pages, Mar. 12, 2003.

* cited by examiner

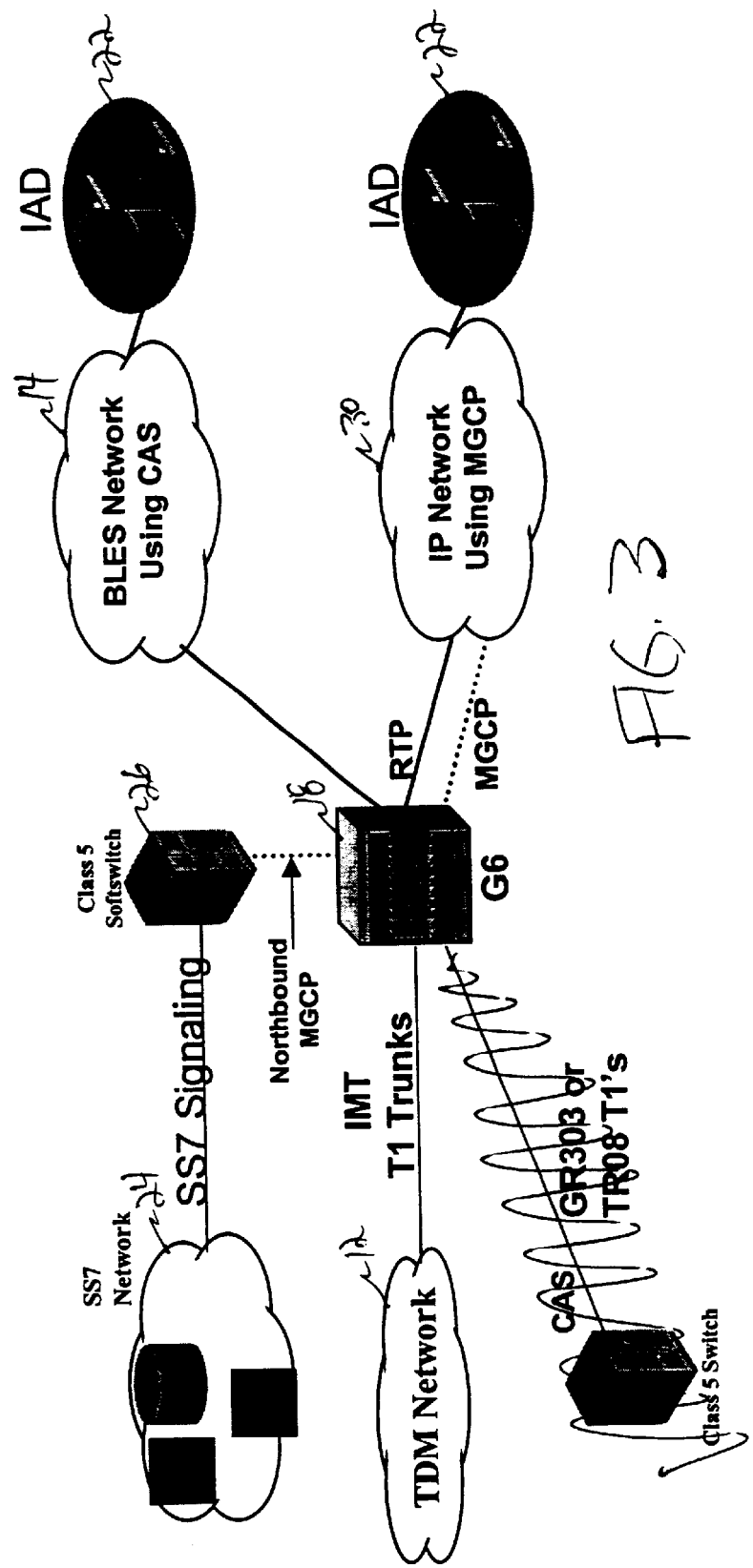

SYSTEM AND METHOD FOR INTERFACING SIGNALING INFORMATION AND VOICE TRAFFIC

TECHNICAL FIELD OF THE INVENTION

The present invention relates in general to telecommunication signal processing and more particularly to a system and method for interfacing signaling information and voice traffic.

BACKGROUND OF THE INVENTION

Conventional telecommunications systems provide signaling information between a Class 5 softswitch and an Internet Protocol network. The Internet Protocol network also receives voice traffic over a physical link from that of the signaling information. The separate physical links require additional interfacing functionality that may slow down the operation of the network. Therefore, it is desirable to avoid additional processing as a result of this problem.

SUMMARY OF THE INVENTION

From the foregoing, it may be appreciated that by those skilled in the art that a need has arisen for a technique to pass signaling and voice traffic through a common element. In accordance with the present invention, a system and method for interfacing signaling information and voice traffic are provided that substantially eliminate or greatly reduce disadvantages and problems associated with conventional telecommunications system operation.

According to an embodiment of the present invention, there is provided a system for interfacing signaling information and voice traffic protocols that includes gateway operable to receive signaling information in a message based signaling format from a Class 5 softswitch. The gateway receives voice signals from a public switched telephone network and places the voice signals into data packets for transfer to an Internet Protocol network with the signaling information. The data packets and the signaling information may be transferred over a common physical link and over separate logical links.

The present invention provides various technical advantages over conventional telecommunications system operation. For example, one technical advantage is to provide signaling information and voice traffic from a common gateway instead of from separate network elements. Another technical advantage is to eliminate the signaling link between the Class 5 softswitch and the Internet Protocol network. Yet another technical advantage is to evolve the public switched telephone network to a packet based broadband distributed network. Other technical advantages may be readily apparent to those skilled in the art from the following figures, description, and claims.

DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates a block diagram of a telecommunications network with both the signaling interface and concentrator techniques.

DETAILED DESCRIPTION OF THE INVENTION

Figure 1:
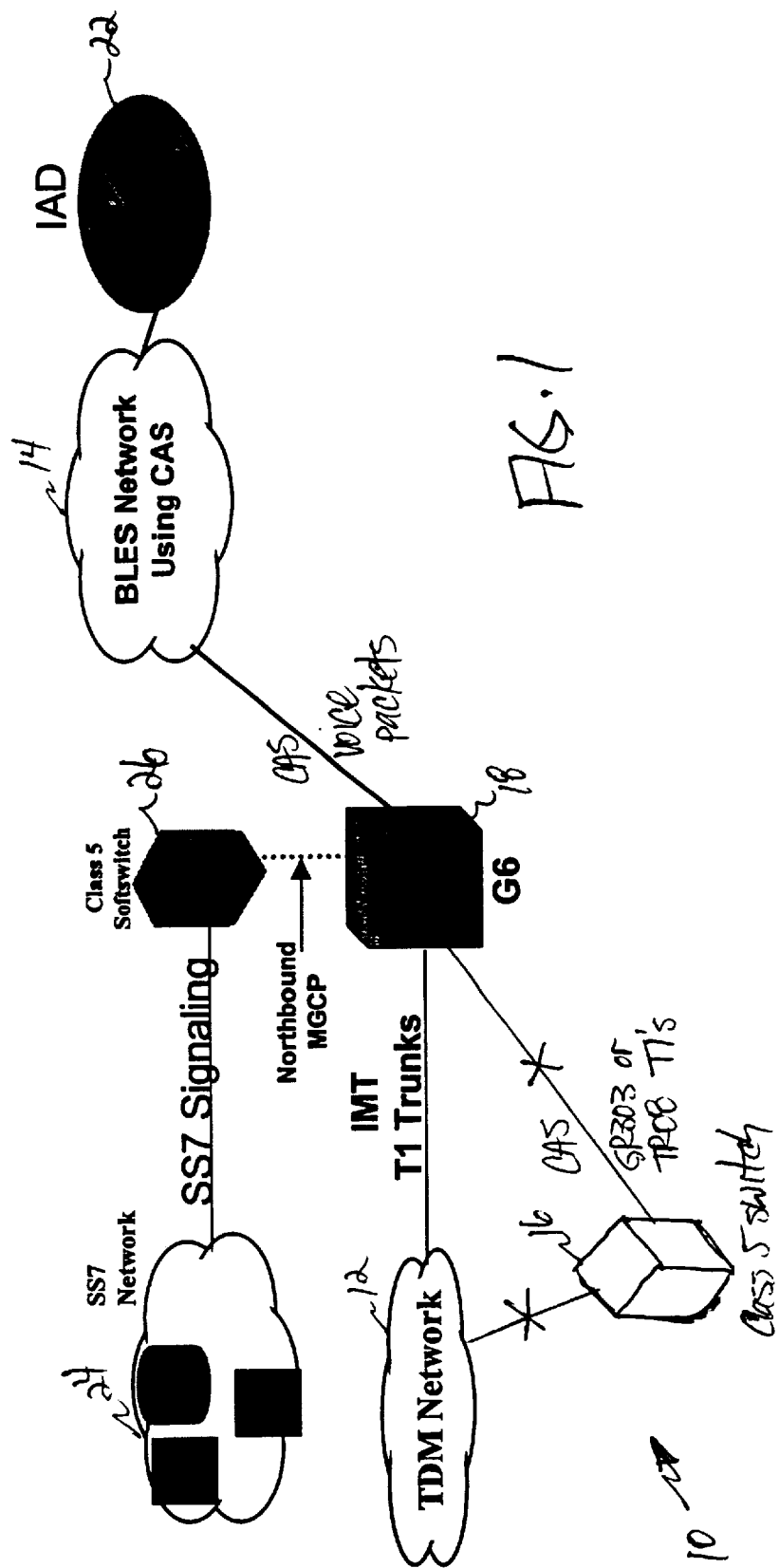
FIG. 1 illustrates a block diagram of a telecommunications network implementing a signaling interface technique.

FIG. 1 shows a block diagram of a telecommunications network 10 implementing a signaling interface technique. Telecommunications network 10 includes a public switched telephone network (PSTN) 12 and a broadband loop emulation service (BLES) network 14. Conventionally, PSTN 12 couples to BLES network 14 through a Class 5 switch 16 and a gateway 18 in order to provide communications to and from an integrated access device (IAD) 20 at a customer premises 22. Signaling information having one of various broadband loop emulation service signaling protocols, including a channel associated signaling format and a BLES common channel signaling format, is received at gateway 18 from Class 5 switch 16 for transfer to BLES network 14. Channel associated signaling is used to determine such information as ringing, off-hook, and on-hook for a normal plain old telephone service (POTS) telephone. Gateway 18 transfers pulse code modulated voice signals and the signaling information preferably over BLES network 14 using asynchronous transfer mode cells to an appropriate IAD 20.

According to the present invention, a signaling network 24 provides signaling information in a network signaling format to a Class 5 softswitch 26. The Class 5 softswitch 26 converts the network signaling format to a media gateway and call session control format. Class 5 softswitch 26 provides the call control, feature activation control, and call accounting intelligence for telecommunications network 10. In the broadband loop emulation services proxy network architecture of telecommunications network 10. Class 5 softswitch 26 is responsible for and has the authority to accept and control both incoming call requests from the network as well as outgoing call requests from customer premises 22. Class 5 softswitch 26 utilizes network signaling to and from the network and the media gateway and call session control format to and from gateway 18 to establish and teardown subscriber calls and invoke call features on existing calls. Gateway 18 receives the media gateway and call session control format from Class 5 softswitch 26 for processing in order to provide signaling information to the BLES network 14. Examples of media gateway and call session control protocols include Signaling Gateway Control Protocol (SGCP), Media Gateway Control Protocol (MGCP), H.248, H.323, and Signaling Interface Protocol (SIP) signaling standards.

In operation, Class 5 softswitch 26 receives signaling information in a network signaling format from signaling network 24. Signaling network 24 is shown using an SS7 network signaling format example but may be configured to use any of a variety of signaling protocols to include international signaling configurations such as the C7 signaling protocol and other signaling protocols such as SIP, SIP-T, BICC, and Sigtran. Class 5 softswitch converts the signaling information received in the network signaling format from signaling network 24 to a media gateway and call session control format. The media gateway and call session control format may be any of a variety of such formats including those specified above. The media gateway and call session control format is provided to gateway 18 for conversion to the desired broadband loop emulation service signaling protocol and passed on to IAD 20 at customer premises 22 through BLES network 14.

In order for gateway 18 to support and perform the BLES proxy signaling function, gateway 18 includes additional capabilities over and above those needed for conventional BLES operation. These capabilities include dial tone generation, hook flash detection, frequency shift keying tone detection for caller identification generation, tone detection, digit collection, and call progress tones including re-order tones, busy tones, and fast busy tones. Class 5 softswitch 26, through the signaling information, instructs gateway 18 as to which of the capabilities gateway 18 is to perform.

For reverse operation, signaling information in the broadband loop emulation service signaling format is provided to gateway 18 by IAD 20 at customer premises 22 through BLES network 14. Gateway 18 converts the broadband loop emulation service signaling format to a media gateway and call session control format. Gateway 18 provides signaling information in the media gateway and call session control format to Class 5 softswitch 26. Class 5 softswitch converts the media gateway and call session control format to a network signaling format. Signaling information in the network signaling format is provided for transfer within signaling network 24 by Class 5 softswitch 26. The present invention may accommodate any type of signaling information as alluded to above.

Figure 2:
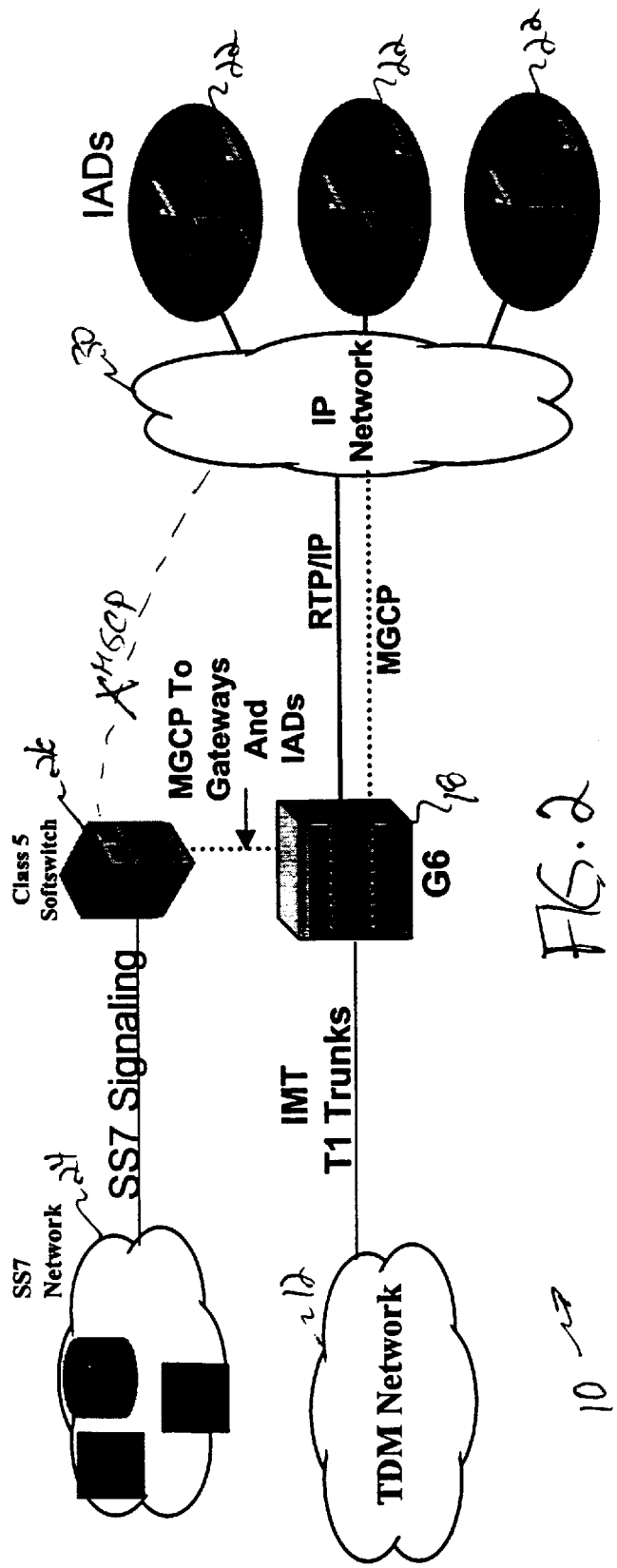
FIG. 2 illustrates a block diagram of a telecommunications network implementing a concentrator technique.

FIG. 2 shows a block diagram of telecommunications 20 implementing a concentrator technique separate and distinct from the signaling interface of FIG. 1. Telecommunications network 20 includes PSTN 12, signaling network 24, Class 5 softswitch 26, and gateway 18. Telecommunications network 20 also includes an Internet Protocol (IP) network 30 coupled to various IADs 20 at a plurality of customer premises 22. Gateway 18 receives pulse code modulated voice signals carried over inter-machine trunks from PSTN 12. Gateway 18 converts the voice signals to Realtime Transport Protocol (RTP) packets for transmission to appropriate IADs 20 over IP network 30. The IADs 20 receive the RTP packets and convert the information carried therein back to voice signals. Gateway 18 receives signaling information in the media gateway and call session control format from Class 5 softswitch 26. The signaling information assist gateway 18 by identifying which trunk provides the voice signals, which IAD 20 to communicate with, and to connect PSTN 12 to IP network 30. Class 5 softswitch 26 also provides signaling information to IADs 20 over IP network 30 to control individual telecommunications equipment coupled to IADs 20 at customer premises 22.

To eliminate a need for a signaling information link from Class 5 softswitch 26 to IADs 20, the signaling information for controlling individual pieces of telecommunications equipment coupled to IADs 20 may be processed through gateway 18. Gateway 18 provides management of signaling information between Class 5 softswitch 26 and IADs 20. Gateway 18 performs translation of the signaling information between Class 5 softswitch 26 and IADs 20. Gateway 18 will provide both the voice encoded RTP packets and the signaling information in the media gateway and call session control format to IADs 20. This technique eliminates the requirement of coupling Class 5 softswitch 26 to IP network 30. Class 5 softswitch 26 no longer needs to keep track of all IADs 20 being communicated with as this function is now off loaded to extended routing capabilities in gateway 18. The RTP packets and the signaling information are provided on separate logical paths from gateway 18 to IADs 20 and may or may not be provided on the same physical link therebetween. Thus, gateway 18 provides concentration of signaling information with voice encoded packets to destination IADs 20.

Gateway 18 also handles communications from IADs 20 to PSTN 12 and Class 5 softswitch 26. Gateway 18 may receive voice encoded RTP packets and signaling information in the media gateway and call session control format from IADs 20. Gateway 18 converts the RTP packets into voice signals for transfer to PSTN 12 over the inter-machine trunks. Gateway 18 also processes the signaling information for transfer to Class 5 softswitch 26 and ultimately to signaling network 24.

FIG. 3 shows a block diagram of a telecommunications network 30 incorporating both the signaling interface and concentrator techniques. Gateway 18 can also provide conversion of the broadband loop emulation service signaling protocol to the media gateway and call session control format for transfer of signaling information from Class 5 switch 16 or BLES network 14 to IP network 30. Gateway 18 may also provide the conversion of signaling information from Class 5 switch 16 or BLES network 14 for transfer to Class 5 softswitch 26. Gateway 18 further provides the concentration function discussed above.

The signaling interface and concentrator features provided by gateway 18 discussed above enable service providers to deploy a softswitch architecture together with standards based voice over digital subscriber lines (VoDSL) without requiring the change out of multiple generations of IADs 20. In the first stages of VoDSL deployment, the installed base of VoDSL IADs 20 primarily support asynchronous transfer mode (ATM) based broadband loop emulation services. In order to deploy VoDSL in a next generation softswitch architecture, IADs 20 must be able to support voice over internet protocol (VoIP), MGCP, h.248/Megaco, SIP, among other new telephone features. This would force service providers to do a complete change out of customer premises hardware, resulting in increased costs and disruption of services. Gateway 18 allows service providers to migrate their existing network to next generation packet technologies. Gateway 18 is able to offer service providers the flexibility to deploy VoDSL in a Class 5 derived architecture, a pure softswitch architecture, or a hybrid architecture regardless of the network topology or standards based protocol enabled in IAD 20.

In summary, gateway 18 offers for example integrated northbound and southbound MGCP, H.248/Megaco, and SIP in combination with the BLES proxy feature that is able to take for example AAL2 BLES from IAD 20 and translate it to MGCP, H.248, and SIP to enable a seamless interface with a softswitch architecture. Along with the concentrator feature, the BLES proxy feature allows service providers to deploy standards based VoDSL immediately without forcing a major upgrade of customer premises equipment to migrate the network for supporting a Class 5 replacement or advanced services provided by a softswitch. The present invention makes different types of customer premises equipment appear uniform to the switching core, enabling service providers to de-couple the core network switching evolution from the access equipment.

Thus, it is apparent that there has been provided, in accordance with the present invention, a system and method for interfacing between signaling protocols that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for interfacing between signaling protocols, comprising:

a gateway operable to receive signaling information in a message based signaling format from a Class 5 softswitch, the gateway operable to receive voice signals from a public switched telephone network, the gateway operable to place the voice signals into data packets for transfer to an Internet Protocol network with the signaling information to establish a call connection from a public switched telephone network user to an Internet Protocol network user and eliminate coupling of the Class 5 softswitch to the Internet protocol network.

2. The system of claim 1, wherein the gateway is operable to receive signaling information in a media gateway control protocol format.

3. The system of claim 1, wherein the data packets and the signaling information are transferred over a common physical link.

4. The system of claim 1, wherein the data packets and the signaling information are transferred over separate logical links.

5. The system of claim 1, wherein the gateway is operable to receive signaling information in a H.248 protocol format.

6. The system of claim 1, wherein the gateway is operable to receive signaling information in a signaling interface protocol format.

7. The system of claim 1, further comprising: a Class 5 softswitch operable to receive signaling information in a network signaling format, the Class 5 switch operable to convert the network signaling format to the message based signaling format.

8. The system of claim 7, wherein the network signaling format is a SS7 signaling format.

9. The system of claim 7, wherein the network signaling format is a C7 signaling format.

10. The system of 7, wherein the gateway is operable to provide signaling information to the Class 5 softswitch in the message based signaling format, the Class 5 softswitch operable to convert the message based signaling format to the network signaling format.

11. A method for interfacing signaling information and voice traffic, comprising:

receiving signaling information in a message based signaling format at a gateway from a Class 5 softswitch;

receiving voice traffic from an inter-machine trunk;

placing the voice traffic into data packets;

transferring the data packets and the signaling information to an Internet Protocol network to establish a call connection from a public switched telephone network user to an Internet Protocol network user and eliminate coupling of the Class 5 softswitch to the Internet protocol network.

12. The method of claim 11, wherein the data packets and the signaling information are transferred over a common physical link.

13. The method of claim 11, wherein the data packets and the signaling information are transferred over separate logical links.

14. The method of claim 11, wherein the message based signaling format follows one of a media gateway control protocol, H.248 protocol, or signaling interface protocol.

15. The method of claim 11, further comprising:

eliminating any link between the Class 5 softswitch and the Internet Protocol network.

16. A method for interfacing signaling information and voice traffic, comprising:

receiving signaling information in a message based signaling format and data packets carrying voice traffic at a gateway from an Internet Protocol network to establish a call connection from an Internet Protocol network user to a public switched telephone network user;

extracting the voice traffic from the data packets;

providing the voice traffic to an inter-machine trunk;

providing the signaling information to a Class 5 softswitch to establish a call connection from the Internet Protocol network user to the public switched telephone network user and eliminate coupling of the Class 5 softswitch to the Internet protocol network.

17. The method of claim 16, wherein the data packets and the signaling information are received on a common physical link.

18. The method of claim 16, wherein the data packets and the signaling information are received on separate logical links.

19. The method of claim 16, wherein the message based signaling format follows one of a media gateway control protocol, H.248 protocol, or signaling interface protocol.

20. The method of claim 16, wherein the Internet Protocol network has no link to the Class 5 softswitch other than through the gateway.

* * * * *